United States Patent [19]
Lindenman et al.

[11] Patent Number: 5,509,682
[45] Date of Patent: Apr. 23, 1996

[54] FIFTH WHEEL HITCH ASSEMBLY

[75] Inventors: Thomas W. Lindenman, South Bend; Richard McCoy, Granger, both of Ind.

[73] Assignee: Reese Products, Inc., Elkhart, Ind.

[21] Appl. No.: 319,758

[22] Filed: Oct. 7, 1994

[51] Int. Cl.$^6$ ................................................. B62D 53/08
[52] U.S. Cl. ..................... 280/440; 280/438.1; 280/474
[58] Field of Search .................................. 280/433, 434, 280/438.1, 440, 474

[56] References Cited

U.S. PATENT DOCUMENTS

| | | | |
|---|---|---|---|
| 1,996,162 | 4/1935 | Lubbers | 280/440 |
| 2,027,990 | 1/1936 | Lubbers | 280/440 |
| 2,289,079 | 7/1942 | Seyferth | 280/440 |
| 2,507,616 | 5/1950 | Stephen | 280/440 |
| 2,513,117 | 6/1950 | Stephen | 280/440 |
| 2,543,749 | 3/1951 | Walther | 280/440 |
| 2,778,657 | 1/1957 | Chaplin | 280/440 |
| 2,779,605 | 1/1957 | Braunberger | 280/440 |
| 2,809,851 | 10/1957 | Beck | 280/438.1 |
| 2,856,203 | 10/1958 | Kayler | 280/440 |
| 3,073,624 | 1/1963 | Thomas | 280/438.1 |
| 4,721,323 | 1/1988 | Czuk et al. | 280/433 |
| 4,892,324 | 1/1990 | Spencer et al. | 280/440 |

FOREIGN PATENT DOCUMENTS 38928  11/1981  European Pat. Off. ............. 280/440

*Primary Examiner*—Mitchell J. Hill
*Attorney, Agent, or Firm*—King & Schickli

[57] ABSTRACT

A fifth wheel hitch includes a frame for mounting to a towing vehicle and a head assembly for engaging a trailer to be towed. The head assembly is mounted for pivotal movement relative to the frame by means of a pivot pin secured to the head assembly, a yoke for receiving the pivot pin, a support bracket on the frame for receiving the yoke and a damping element for engaging the yoke and the support bracket. A connecting pin secures the pivot pin in the yoke.

8 Claims, 2 Drawing Sheets

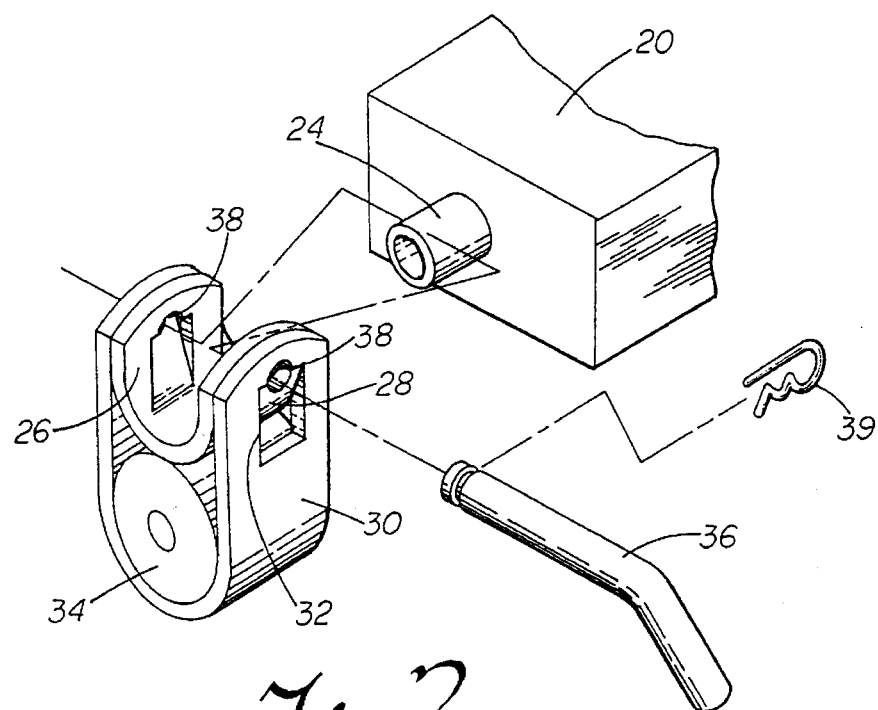
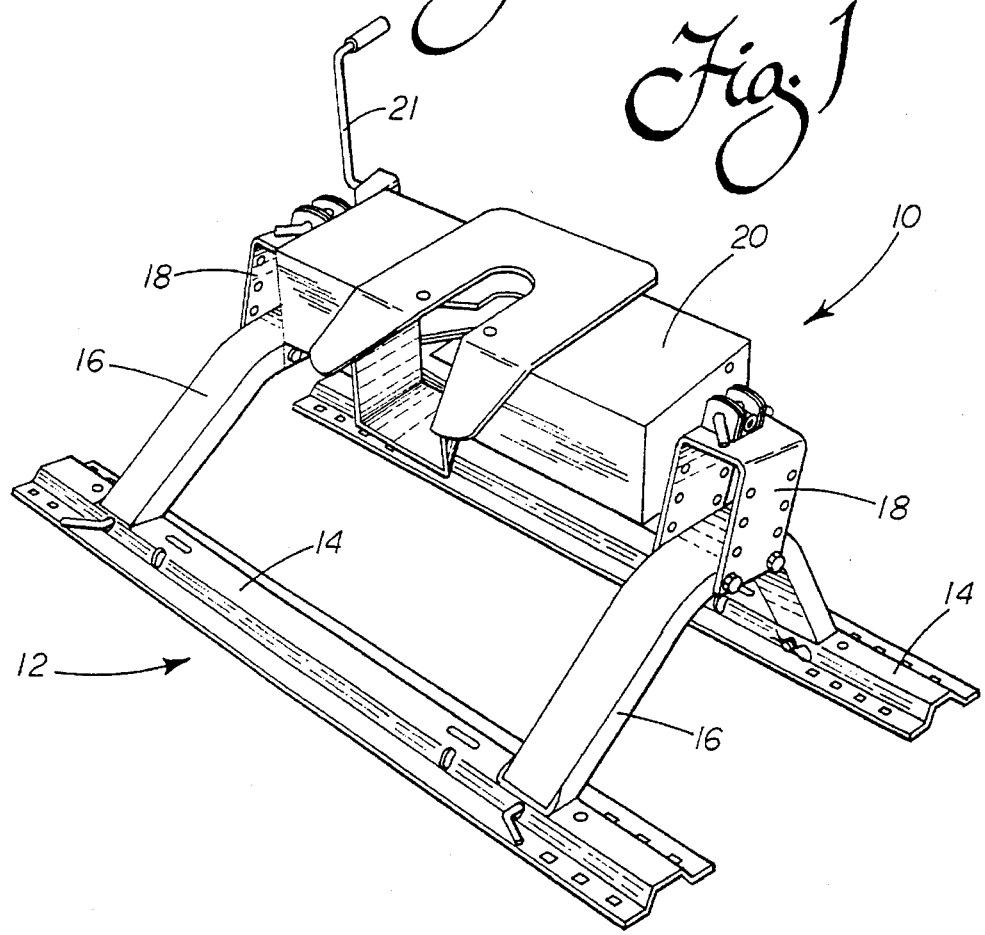

FIFTH WHEEL HITCH ASSEMBLY

TECHNICAL FIELD

The present invention relates generally to the trailer towing field and, more particularly, to an improved fifth wheel hitch assembly including an element for damping vibration and shock loads so as to provide smoother towing and enhanced performance.

BACKGROUND OF THE INVENTION

Fifth wheel hitches for towing a trailer behind a towing vehicle have long been known in the art. Examples of state of the art fifth wheel hitches include those presently manufactured by Reese Products, Inc. of Elkhart, Ind. under product numbers 30026, 30027 and 30028 and U.S. Pat. No. 4,721,323.

These state of the art fifth wheel hitches include a support frame for mounting the hitch to the towing vehicle, such as, for example, to a bed of a pick up truck. This support frame includes a pair of mounting rails that are bolted to the bed and/or frame of the truck, side brackets that are releasably mounted to the rails and a head support mounted to the side brackets. A head assembly is mounted to the head support by means of a trunnion arrangement allowing for pivotal fore-and-aft movement. The head assembly includes a jaw assembly, operable by means of a control handle, that is specifically adapted to releasably engage and hold a king pin of a trailer desired to be towed by the towing vehicle.

While such state of the art fifth wheel hitch provide excellent overall performance and dependable operation, it is believed that improvements in design are still possible. More particularly, state of the art fifth wheel hitches of the type described have no true means for effectively damping vibrations and/or shock loads as, for example, may occur when traversing expansion joints and warning strips as well as cracks and bumps in the roadway. A need is therefore identified for an improved fifth wheel hitch assembly.

SUMMARY OF THE INVENTION

Accordingly, it is a primary object of the present invention to provide a fifth wheel hitch assembly, including a structure for damping vibration and shock loads, that is relatively inexpensive to produce and easily assembled to provide reliable performance over a long service life.

Another object of the present invention is to provide a structure for damping the vibration between a head assembly and frame of a fifth wheel hitch that may be readily retrofitted to existing state of the art fifth wheel hitches already in service in the field.

Still another object of the present invention is to provide a fifth wheel hitch assembly for towing a trailer including a simple structural arrangement for damping vibration between the head assembly and frame of the hitch so as to allow smoother towing readily acceptable to those riding in the towing vehicle.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved fifth wheel hitch is provided for towing a trailer behind a towing vehicle. The fifth wheel hitch includes a frame having means for mounting the frame to the towing vehicle and a head assembly including means for engaging the king pin of the trailer to be towed behind the vehicle. Further, means are provided for pivotally mounting the head assembly to the frame so as to allow pivotal movement at least, in the fore-and-aft directions.

More specifically, the mounting means includes a pivot pin secured to each side of the head assembly. A yoke is provided for receiving each pivot pin. This yoke is received in a support bracket that may be releasably mounted or permanently fixed to the frame.

Additionally, the fifth wheel hitch includes a means for damping vibration and shock loads. The damping means, preferably in the form of a rubber spring, is disposed between and engages the yoke and the support bracket. More specifically, both the yoke and support bracket are substantially u-shaped. When assembled together, the yoke nests in the support bracket resting upon the rubber spring that is held and supported in the crotch of the support bracket by adhesive or some other appropriate means.

Still more specifically, each yoke also includes a pair of outwardly projecting retaining tabs. Each support bracket includes a pair of cooperating elongated slots for receiving the retaining tabs. The elongated slots have a width that is slightly greater than the width of the tabs. When a yoke is assembled in a support bracket, the tabs extend into the slots. Due to the elongation of the slots, the tabs allow some limited freedom of movement in the vertical direction. Accordingly, this structural arrangement allows sliding movement of the yoke relative to the support bracket. As the yoke rests upon the retaining spring, damping of vibration and shock loads in the vertical direction is thereby provided.

Further, it should be appreciated that the rubber spring provides variable resistance to load. More specifically, the greater the compression of the rubber spring during loading, the greater the resistance to compression and, therefore, the greater the damping. Hence, the damping characteristics of the rubber spring naturally functions to meet the damping requirements under substantially any driving conditions that could reasonably be expected to be encountered. That is, low damping levels to provide isolation of small vibrations and higher damping levels to provide some control of larger vibrations and shock loads.

Of course, the fifth wheel hitch also includes a connecting pin for securing the pivot pin in the yoke and, therefore, holding the entire assembly together. More specifically, the connecting pin is received through the pair of elongated slots in the support bracket and the pair of cooperating apertures in the yoke which are aligned with the elongated slots when the yoke is nested therewith while resting on the rubber spring.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawing incorporated in and forming a part of the specification, illustrates several aspects of the present invention and together with the description serves to explain the principles of the invention. In the drawing:

FIG. 1 is a perspective view of the fifth wheel hitch assembly of the present invention;

FIG. 2 is an exploded view showing one side of the pivotal mounting structure of the fifth wheel hitch providing for the damping of vibrations and shock loads.

Figure 3:
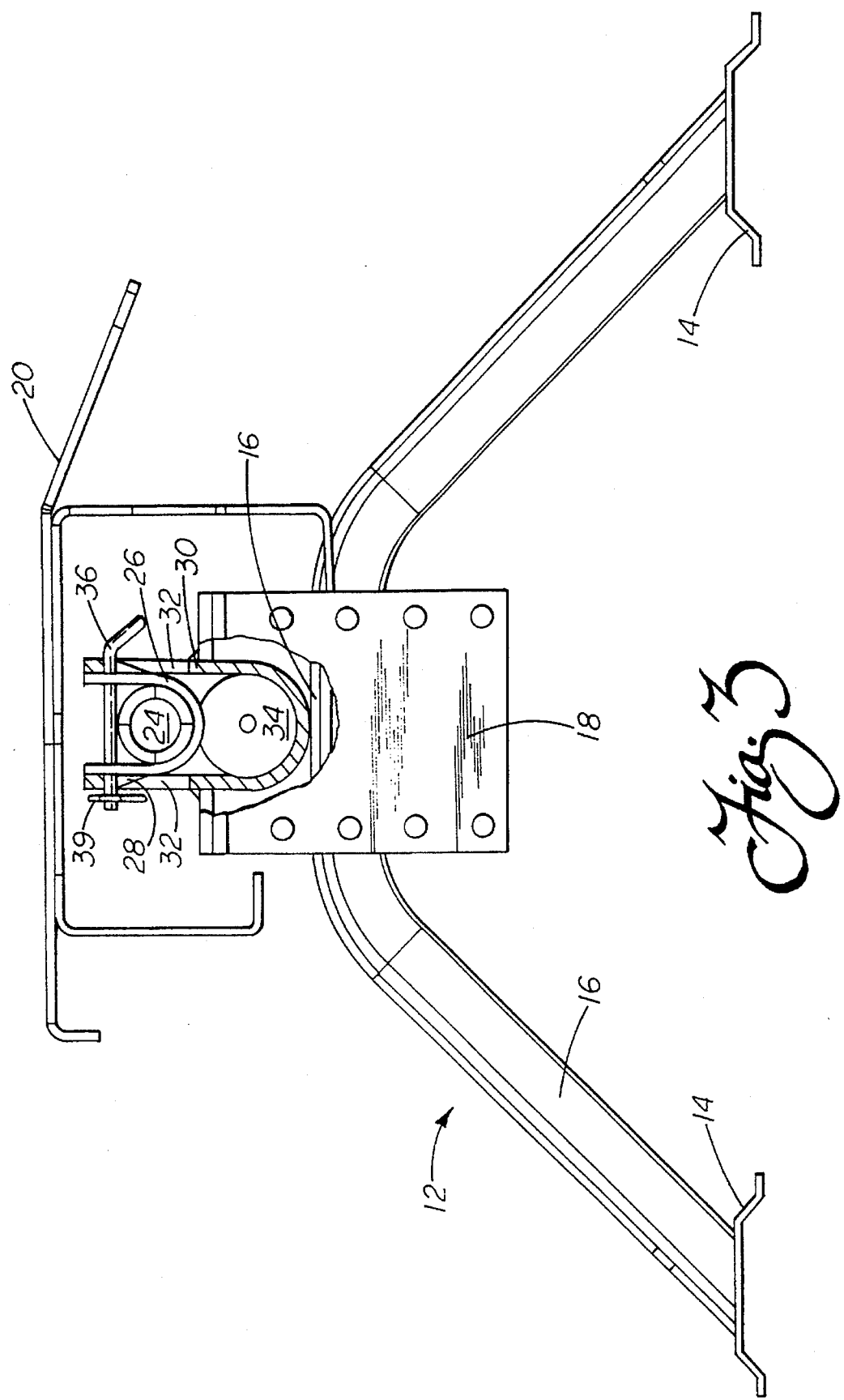
FIG. 3 is a schematical side elevational view again showing one side the pivotal mounting structure of FIG. 2 in the assembled condition under static load. A mirror image arrangement is provided at the opposite side or end of the frame and head assembly so as to allow relative pivotal movement therebetween.

Reference will now be made in detail to the present preferred embodiment of the invention, an example of which is illustrated in the accompanying drawing.

DETAILED DESCRIPTION OF THE INVENTION

Reference is now made to FIG. 1 showing the fifth wheel hitch 10 of the present invention for towing a trailer (not shown) behind a towing vehicle such as a pick up truck (also not shown). The hitch 10 includes a support frame, generally designated by reference numeral 12, comprised of a pair of spaced, parallel mounting rails 14, a pair of side brackets 16 and a head support 18.

The mounting rails 14 are mounted directly to the towing vehicle in a manner well known in the art. For example, the mounting rails 14 may be positioned in the bed of a pick up truck with one forward and one rearward of the rear axle. There the rails are bolted in position to the bed and frame of the vehicle.

The side brackets 16 are releasably mounted to the mounting rails 14 by means of pull-pins that may be held in position by spring cotter pins. The head support 18 is then mounted as a cross member between the side brackets 16 at a selected height by means of, for example, nut and bolt fasteners that extend through cooperating apertures through the head support and side brackets.

The hitch 10 also includes a head assembly, generally designated by reference numeral 20. As is known in the art, the head assembly 20 is adapted to connect with the king pin of the trailer to be towed. Toward this end, the head assembly 20 includes a jaw assembly of a type known in the art that may be releasably locked by means of a control handle 21 to secure the king pin of the trailer in a manner known in the art.

As should be appreciated from a review of the drawing figures, the head assembly 20 is pivotally mounted to the head support 18 of the frame 12. The structure for pivotally mounting the head assembly 20 to the frame 12 is generally designated by reference numeral 22 and is the primary focus of the present invention.

As best shown in drawing FIGS. 2 and 3, a pivot pin 24 extends laterally, outwardly from the end walls of the head assembly 20. Each pivot pin 24 may be integrally formed with the housing of the head assembly 20 or may be connected thereto via a fastener by any manner known in the art. Each pivot pin 24 is received in a yoke 26. Each yoke 26 is substantially u-shaped and includes a pair of outwardly projecting retaining tabs 28, the function of which will be described in greater detail below.

As further shown in the drawing figures, the yokes 26 are each received in a cooperating support bracket 30. Each support bracket 30 is substantially u-shaped but of larger dimension than the yoke 26 that it receives so that the yoke 26 are able to nest therein. The support brackets 30 are mounted on the head support 18 of the frame 12 adjacent the side brackets 16 (i.e. one at each side).

Each support bracket 30 includes a pair of cooperating, elongated slots 32 for receiving the retaining tabs 28 of the yokes 26 when the yokes 26 are properly mounted and carried in the support brackets. As should be appreciated, the elongated slots 32 have a slightly larger width than the retaining tabs 28 they receive so as to allow for sliding movement of the yoke relative to the support bracket in which it nests and is captured. As should be appreciated, the sliding movement is at least in a substantially vertical direction; that is, toward and away from the head support 18 of the frame 12. The yokes 26 are installed or nested within the support brackets 30 by forcing the yokes downward and snapping the retaining tabs 28 into the elongated slots 32.

A damping element in the form of a resilient rubber spring 34 is positioned in the crotch of the u-shaped support bracket 30. There it may be fixed by adhesive or some other means. As shown the rubber spring engages both the support bracket 30 and the yoke 26 so that when the fifth wheel hitch 10 is connected to a trailer, the load transferred to the yokes rests upon the underlying rubber springs 34. Preferably, each rubber spring 34 is formed from a cylinder of Durometer Neoprene rubber having a size of, for example, two inches in outer diameter, three eighths inch in inner diameter and two inches in length. As will be described in greater detail below such rubber springs 34 are able to provide the desired damping action to control vibration and isolate noise.

A pair of connecting pins 36 secure the entire assembly together. More specifically, a connecting pin 36 is received through the pair of elongated slots 32 in each support bracket 30 and a pair of cooperating apertures 38 in each of the associated yokes 26, the apertures being aligned with the elongated slots. As should be appreciated, the pair of apertures 38 are located adjacent to and immediately above the retaining tabs 28. A spring clip 39 secures each connecting pin in position.

In operation, the fifth wheel hitch 10 of the present invention provides excellent towing smoothness and ride quality. For example, when driving down a highway at a steady low to medium speed, the regular and periodic traversing of expansion joints may cause a significant vibration to develop in the hitch assembly at a particular resonance frequency. This vibration may be transferred to the passenger compartment of the towing vehicle creating a nuisance to the driver and passenger alike. Advantageously, the present invention reduces or substantially eliminates this annoyance by providing a damping effect. More specifically, the relative sliding movement allowed as a result of the nesting of the yoke 26 in the support bracket 30 and the positioning of the retaining tabs 28 in the elongated slots 32 allows the yoke, pivot pin 24 and the head assembly 20 connected thereto to "float" relative to the frame 12. Since the yokes 26 rest on the rubber spring 34, damping is provided in a vertical direction and vibration is therefore isolated/controlled.

As a further example, it is also often not possible to safely avoid large cracks or bumps in the roadway. Together, the size of the bump and the speed of the vehicle may result in a sudden shock load being placed upon the fifth wheel hitch 10. Advantageously, the rubber springs 34 significantly aid in controlling the sudden shift in weight and reducing the shock transmitted to the towing vehicle. More particularly, it should be appreciated that the rubber springs 34 provide a variable resistance to load that increases with the deflection from the static load position. More specifically, the greater the compression of the rubber spring 34, the greater the resistance to further compression and, therefore, the greater the damping action. Accordingly, larger vibrations and shock loads are met with increased damping capacity. As a result, it should be appreciated that good control is provided for a full range of vibrations and loads. Of course, upper and lower limits can be reached and these are identified by the engagement of the retaining tabs 28 with the upper and/or lower ends of the elongated slots 32. Further, it should be appreciated that the connecting pins 36 also serve a limiting function.

It should further be noted that the rubber springs 34 also provide a limited range of side-to-side pivotal motion on the order of +/−3° from the horizontal. Accordingly, when engaging a sharp bump on only one side of the vehicle, when traversing a grade or when maneuvering in a close area and turning sharply, the unbalanced load placed upon the fifth wheel hitch 10 and particularly, the jaw assembly engaging the king pin of the trailer is at least partially accommodated and, therefore, strain is significantly reduced or relieved. In this way, the service life of the jaw assembly and, therefore, the fifth wheel hitch 10 may be extended and the integrity of the coupling of the trailer is enhanced. Additionally, this side-to-side flexibility allows the head assembly 20 to flex and follow the king pin plate of the trailer when attempting to connect a trailer to a towing vehicle with the trailer and towing vehicle on different grades. Thus, binding is prevented in many cases and connection is possible without the need for blocking up the trailer or ramping up the vehicle.

In summary, numerous benefits result from employing the concepts of the present invention. Advantageously, the fifth wheel hitch 10 is relatively inexpensive to manufacture and easy to assemble. As a result of the variable damping properties provided by the rubber springs 34, vibrations and shock loads are better controlled and the transmission of these annoying vibrations and loads to the towing vehicle is significantly reduced. Further, the strain on the hitch assembly 10 resulting from such loading is significantly reduced and, therefore, the service life of the hitch assembly may be expected to be extended.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with breadth to which they are fairly, legally and equitably entitled.

We claim:

1. A fifth wheel hitch assembly for towing a trailer behind a towing vehicle, comprising:

a frame including means for fixing said frame to the towing vehicle;

a head assembly including means for engaging the trailer to be towed by the towing vehicle; and means for mounting said head assembly for pivotal movement relative to said frame, said mounting means including a pivot pin secured to said head assembly, a yoke for receiving said pivot pin, a support bracket for receiving said yoke, and a means for damping vibration and shock loads engaging between said yoke and said support bracket;

said yoke further including a pair of outwardly projecting retaining tabs and said support bracket including a pair of cooperating elongated slots for receiving said retaining tabs while allowing sliding movement of said yoke relative to said support bracket at least in a substantially vertical direction.

2. The fifth wheel hitch assembly set forth in claim 1, wherein said damping means is a rubber spring and said support bracket is u-shaped.

3. The fifth wheel hitch assembly set forth in claim 1, including a connecting pin for securing said pivot pin in said yoke, said connecting pin being received through said pair of elongated slots in said support bracket and a pair of cooperating apertures in said yoke aligned with said elongated slots.

4. The fifth wheel hitch assembly set forth in claim 3, wherein said pair of apertures are located adjacent to and above said retaining tabs.

5. A fifth wheel hitch assembly for towing a trailer behind a towing vehicle, comprising:

a frame including means for fixing said frame to the towing vehicle;

a head assembly including means for engaging the trailer to be towed by the towing vehicle;

means for mounting said head assembly for pivotal movement relative to said frame, said mounting means including a pivot pin secured to said head assembly, a yoke for receiving said pivot pin, a support bracket for receiving said yoke and means for damping vibration and shock loads, said damping means being disposed between and engaging said yoke and said support bracket; and a connecting pin for securing said pivot pin in said yoke, said connecting pin being received through a pair of elongated slots in said support bracket and a pair of cooperating apertures in said yoke aligned with said elongated slots.

6. The fifth wheel hitch assembly set forth in claim 5, wherein said damping means is a rubber spring.

7. The fifth wheel hitch assembly set forth in claim 5, wherein said yoke includes a pair of outwardly projecting retaining tabs and said support bracket includes a pair of cooperating elongated slots for receiving said retaining tabs while allowing sliding movement of said yoke relative to said support bracket at least in a substantially vertical direction.

8. The fifth wheel hitch assembly set forth in claim 7, wherein said pair of apertures are located adjacent to and above said retaining tabs.

* * * * *